United States Patent [19]
Cooper

[11] 3,945,012
[45] Mar. 16, 1976

[54] WIDE BAND PULSED ENERGY SYSTEM
[75] Inventor: George P. Cooper, Corona Del Mar, Calif.
[73] Assignee: Rockwell International Corporation, El Segundo, Calif.
[22] Filed: Nov. 7, 1966
[21] Appl. No.: 593,237

[52] U.S. Cl. ..................... 343/17.2 R; 343/17.2 PC
[51] Int. Cl.² ....................... G01S 7/28; G01S 9/02
[58] Field of Search .......... 343/17.1, 17.7, 17.5, 13, 343/9, 14, 17.1 R, 17.2 R, 17.5 R, 17.2 PC

[56] References Cited
UNITED STATES PATENTS
3,276,015  9/1966  Lerwill et al.................. 343/17.2 X
3,299,427  1/1967  Kondo ............................. 343/17.1

Primary Examiner—Malcolm F. Hubler
Attorney, Agent, or Firm—H. Frederick Hamann; Rolf M. Pitts

[57] ABSTRACT

A wideband pulsed energy system having improved signal-to-clutter response, and utilizing a chirped or frequency-modulated carrier pulse having a preselectively amplitude modulated envelope. A non-linear receiver-mixer cooperates with a successive intermediate frequency stage (the bandwidth of which correponds to the amplitude modulation bandwidth) for providing an output corresponding to the modulation envelope.

8 Claims, 10 Drawing Figures

*INVENTOR.*
GEORGE P. COOPER

ATTORNEY

WIDE BAND PULSED ENERGY SYSTEM

The subject invention relates to a pulsed energy system having improved response to discrete targets relative to that for a clutter source, and more particularly to a wide-band pulsed-energy system having an improved signal-to-noise ratio in addition to an improved signal-to-clutter response.

Frequently, it is desired to detect the presence of, and determine the range and direction of, a discrete target located amid (i.e., at approximately the same distance and direction as) a clutter patch, such as terrain obstacle, which target may be temporarily almost stationary relative to such clutter. Under such circumstances, doppler processing techniques may not be useful to distinguish such discrete target from the clutter background in which it occurs. The problem of detecting a discrete target located amid the spectrum of a clutter background is discussed in co-pending U.S. Pat. application Ser. Nos. 430,141 filed Feb. 3, 1965, now U.S. Pat. No. 3,500,404, and 476,630 filed Aug. 2, 1965, now U.S. Pat. No. 3,745,578, both of which are assigned to North American Aviation, Inc., assignee of the subject invention. The first mentioned one of such co-pending patent applications also discusses the limitations of prior art "chirp" pulse compression techniques for reducing the clutter content in the receiver output of a pulsed energy system and describes a mutually-coherent, multiple frequency pulsed energy system having enhanced response to discrete targets.

The mutually-coherent, multiple-frequency scheme of the above noted application Ser. No. 476,630 employs a common preselected spacing frequency between adjacent ones of the discrete frequencies employed, as a coding frequency, the center frequency of the receiver IF stages corresponding to such coding frequency. This spacing, or coding, frequency, being selected to be greater than the bandwidth corresponding to the reciprocal of the transmitted pulsewidth, requires in an unduly large system bandwidth where, for example, as many as 100 discrete frequencies are sought to be employed. Such large bandwidth, in turn, results in a large noise content or adverse signal-to-noise ratio. In other words, the enhanced signal-to-clutter performance obtained tends to be offset somewhat by the deterioration in the receiver signal-to-noise ratio. Also, the coherent simultaneous multiple frequency transmission technique of application Ser. No. 476,630 is subject to adverse peak power to average power ratios, which tend to limit the maximum system range performance due to transmitter saturation.

By means of the concept of the subject invention, a chirped or frequency-modulated (F-M) pulse is also amplitude modulated (A-M), whereby the advantages of a chirped signal system and the above-described frequency coding are combined, without suffering the associated disadvantages of each.

In a preferred embodiment of the invention, there is provided a pulsed energy range detection system comprising a non-linear receiver mixer-detector and a successive intermediate frequency receiver stage, and pulsed transmitter means for generating a frequency-modulated carrier having a fixed frequency amplitude-modulation corresponding to the intermediate frequency of the receiver-intermediate frequency stage.

In normal operation of the above-described arrangement, the amplitude modulation envelope of the F-M, A-M carrier is received as an echo from a discrete target and processed by the receiver IF stage. The combined clutter return or echoes of the leading edge of the transmitted pulse from a trailing edge of the clutter patch and the trailing edge of the transmitted pulse from the leading edge of the clutter patch will represent a low average power level, due to the generally non-cophasal relationship (1) between the component carrier frequencies in such combined clutter return at any moment and also (2) between the amplitude modulation of coding frequency imposed upon such carriers. Hence, an improved signal-to-clutter response occurs.

Also, because a linearly frequency-modulated, or chirped carrier is employed, a smaller system bandwidth is required, relative to that employed in the above noted application Ser. No. 476,630, resulting in an improved system signal-to-noise ratio. Further, because a "chirped" carrier is employed, rather than simultaneous mutually coherent frequencies, transmitter saturation due to adverse peak-to-average pulse power ratios is reduced. Moreover, because the system employs an amplitude modulating frequency code, a conventional "dechirp" collapse network is not employed and therefore the problems inherent in matching a "dechirp" collapse network and transmit "chirp" modulation (i.e., conventional chirp pulse compression techniques) are avoided. Accordingly, it is a broad object of the subject invention to provide means for improving the signal-to-clutter response of a pulsed energy system.

It is also an object of the invention to provide means for improving the signal-to-noise ratio of a signal-to-clutter enhanced, pulsed energy system.

It is another object of the invention to provide a pulsed energy system having both improved signal-to-clutter performance and improved signal-to-noise performance.

It is a still another object of the invention to provide a signal-to-clutter performance pulsed energy system having improved peak power performance.

These and other objects of the invention will become apparent from the following description taken together with the accompanying drawings in which.

Figure 1:
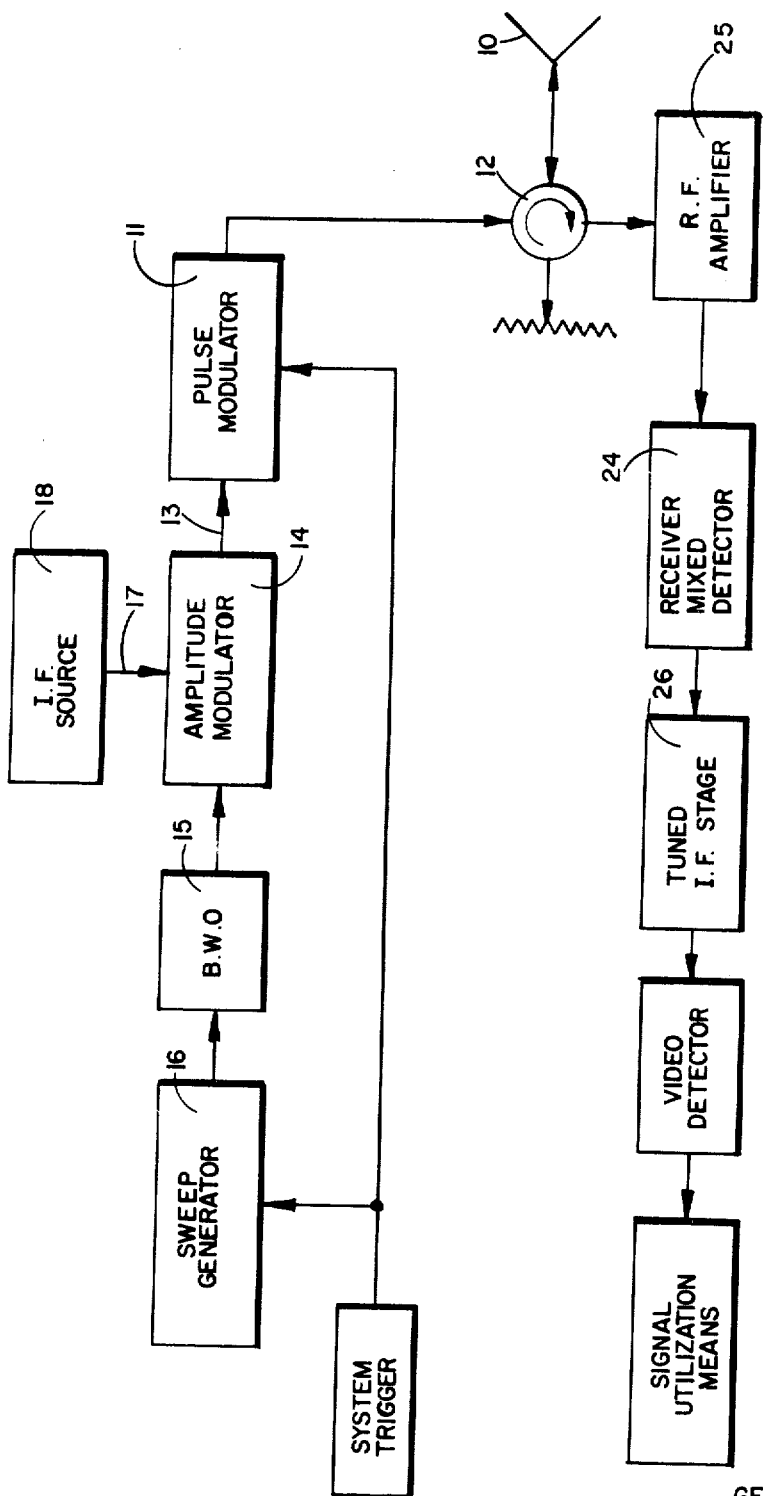
FIG. 1 is a block diagram of a system embodying the concept of the invention.
Figure 2A:
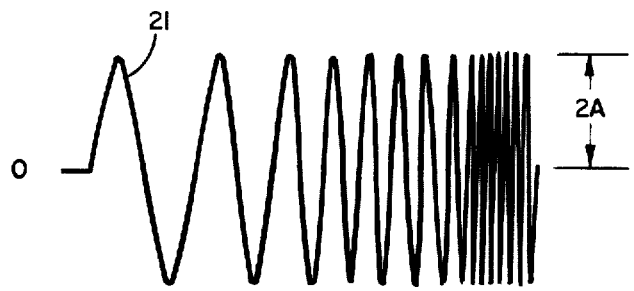
FIGS. 2a, 2b and 2c are a family of time-histories illustrating exemplary waveform responses of several elements of FIG. 1.

Referring now to FIG. 1, there is illustrated a block diagram of a system embodying the inventive concept. There is provided a pulsed radar system comprising pulsed transmitter means including an antenna 10 coupled to the output of a pulse modulator 11 by means of a T-R switch or the like 12. A first input 13 pulse of modulator 11 is operatively coupled by means of a second modulator 14 to a source of a linearly frequency modulated carrier wave. The construction and arrangement of such source are well known in the design of pulse-compression, radar system of the "chirp" type, and an exemplary arrangement is shown in block form only as comprising a backward wave oscillator 15, the frequency of which is scanned in response to a sweep generator 16 which, in turn, is driven periodically in response to a system trigger and in synchronism with pulse modulator 11. A representative time-history of the output of BWO 15 is shown as curve 21 in FIG. 2a.

Figure 2B:
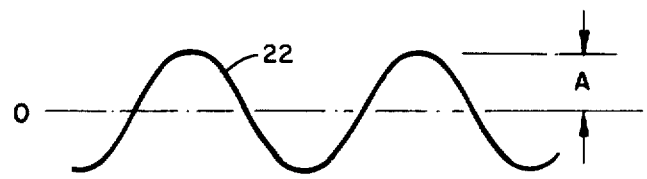

Amplitude modulator 14, interposed between the output of BWO 15 and the input 13 to pulse modulator 11, has a second or modulation input 17 coupled to a source 18 of a fixed intermediate frequency, corresponding to the waveform illustrated as curve 22 in FIG. 2b. The resultant output of second modulator 14, applied as an input to pulse modulator 11, is a linearly frequency modulated waveform having a fixed frequency modulated envelope, as illustrated by curve 23 in FIG. 2b.

There is further provided in the arrangement of FIG. 1, receiving means adapted to be responsive to received echoes of pulsed energy transmitted by the transmitting arrangement of FIG. 1. Such receiving means comprises a non-linear receiver mixer-detector 24 coupled to a receiving port of T-R switch 12 by means of an R-F amplifier 25. The response bandwidths of mixer-detector 24 and receiver amplifier 25 are preselected to be commonly responsive to the spectrum of the transmitted energy or output of modulator 11. The output of mixer-detector 24 is bandpass limited by a narrow-bandpass intermediate frequency stage 26, the center bandpass frequency of which corresponds to the fixed frequency of IF source 18. The construction and arrangement of amplifier 25, mixer-detector 24 and IF stage 26 are well understood in the art, as indicated in the above noted copending application Ser. No. 476,630. Accordingly, these elements are shown in block form only for convenience in exposition.

Figure 2C:
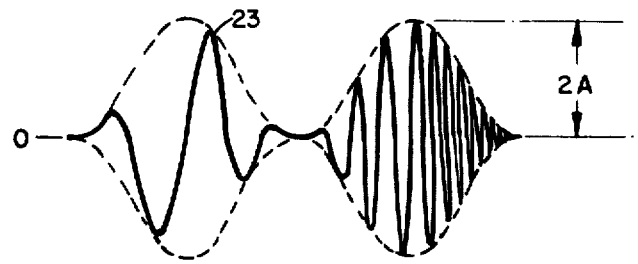

In normal operation of the arrangement of FIG. 1, in response to a discrete target (i.e., one having a radial extent significantly less than that represented by the transmitted pulsewidth), the output of first detector 24 will include the intermediate frequency signal, corresponding to the fixed frequency modulation envelope of curve 23 in FIG. 2c, which signal is translated through IF receiver stage 26, and may be video-detected for utilization by a display indicator or other signal utilization means. Where, however, the received echoes are returned by, or received from a clutter patch having a significant radial extent, relative to that represented by the transmitted pulsewidth, then the response of the mixer-detector to the concomitant receipt of an echo corresponding to the return of the later or terminal end of a transmitted pulse from a near, or front, end of a clutter patch and the return echo of the front end of such transmitted pulse received from a further, or more distant, portion of such clutter patch provides a combined clutter signal. Because of the carrier frequency difference between the front and back, or different, portions of the transmitted pulse, the combining of the echoes thereof, received from a clutter patch, will result in a so-called decorrelated signal, or signal of reduced amplitude, at the output of mixer 24. The beating of such received carrier frequencies will result in a random-appearing spectral distribution with little energy within the bandpass of IF receiver stage 26. Moreover, the demodulation or recovery of the IF amplitude modulation envelope imposed upon such concomitantly received carrier frequencies results in a series of component signals having a common IF frequency but a random phase relation. In other words, because such IF modulation components are not necessarily received in a mutually co-phasal relation, they tend to be mutually cancelling at the output of receiver mixer 24. Hence, it is to be appreciated that not only does the arrangement of FIG. 1 demonstrate improved response to a discrete target of interest and a reduced sensitivety to clutter, but that the response of the system to a discrete target detected amid a clutter background is significantly enhanced.

Another way of viewing the phenomena of the receiver response to echoes of the FM-AM pulses received from a discrete target amid a clutter background, is that the response of non-linear (so-called square law) detector 24 to the clutter return is mainly a large d-c or zero frequency signal, while the response to a discrete target will be a spectral line displaced from the large d-c clutter line by the amount of the AM coding, or IF, frequency; and this is so, even though the target is not moving relative to the clutter patch in which it occurs. Further, the manifestation of such noncoherently detected phenomenon is unchanged even though the radarplatform is moving relative to the clutter patch (i.e., is airborne).

Although the source of a linearly frequency-modulated microwave carrier in FIG. 1 has been illustrated in FIG. 1 as comprising BWO element 15 responsively coupled to sweep generator 16, it is understood that such arrangement is exemplary only. An alternative arrangement for effecting a linearly frequency-modulated carrier is shown in FIG. 3.

Figure 3:
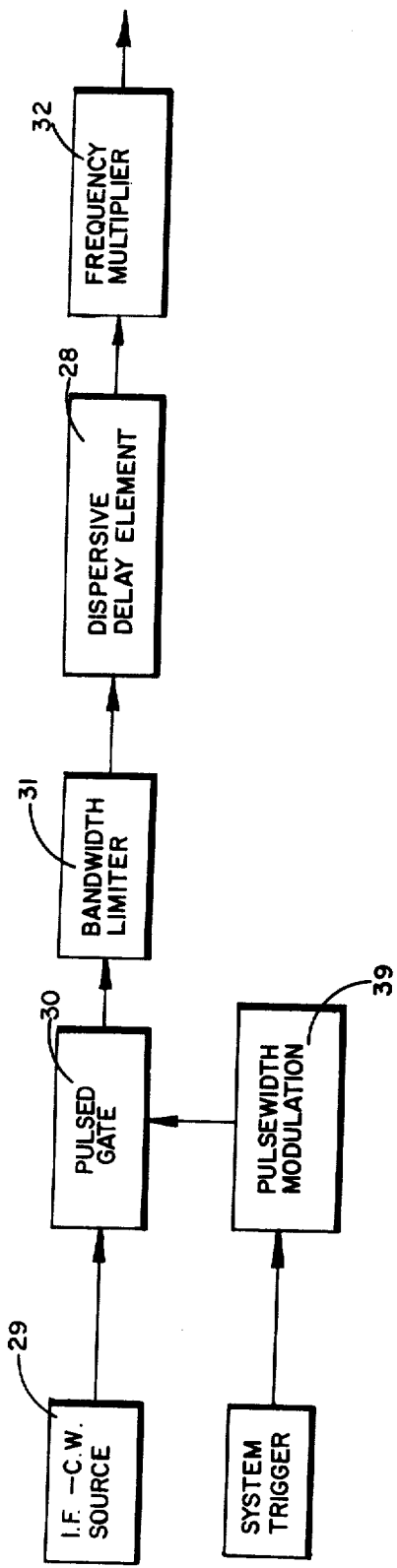
FIG. 3 is a block diagram of an exemplary embodiment of swept radio frequency source for employment in the transmitter of FIG. 1.

Referring to FIG. 3 there is shown in block form an alternate arrangement for generating a linearly frequency modulated carrier. There is provided a phase-dispersive delay line element 28 having an associated bandwidth and being responsively coupled to a source 29 of a continuous wave having a stable intermediate frequency lying within the bandwidth of delay line element 28. Such coupling is effected by means of a pulsed gate 30 and bandwidth limiting means 31. Pulsed gate 30 periodically pulse modulates the output of CW source 29 with a pulsewidth substantially less than that of the pulsed energy system in which it is utilized. In other words, the pulsewidth modulation provided by gate 30 in FIG. 9 represents a pulsewidth interval substantially shorter than that provided by pulse modulator 11 of FIG. 1.

Figure 4A:
FIGS. 4a, 4b and 4c are a family of spectral diagrams of the responses of several elements of the arrangement of FIG. 3.
Figure 4B:
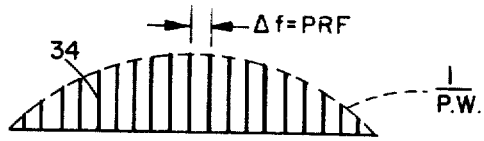

The effect of such short pulsewidth modulation of the output of CW source 29 (which output is shown as curve 33 in FIG. 4a) is the generation of a plurality of intermediate frequencies in addition to the fixed frequency provided by CW source 29, as shown by curve 34 in FIG. 4b. The bandwidth represented by such plurality of frequencies and illustrated by curve 34, is determined by the modulating pulsewidth provided by gate 30 (in cooperation with a source 39 of a pulsewidth modulation signal), the bandwidth increasing as the pulsewidth is narrowed; while the interval ($\Delta F$) in the frequency domain between adjacent frequencies corresponds to the pulse repetition interval.

Figure 4C:
Figure 5:
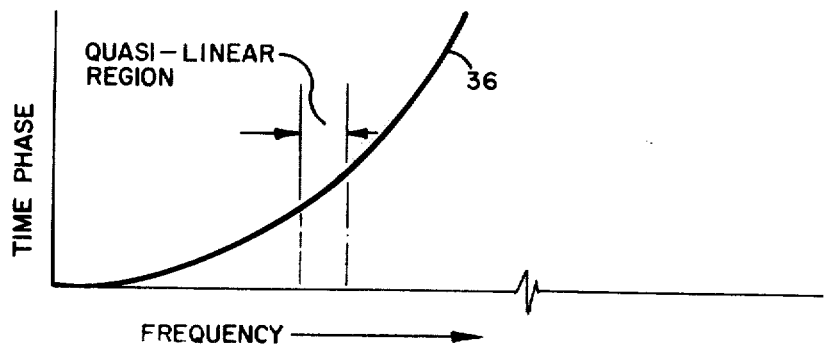

The effect of bandpass filter 31 is to limit the spectral input to delay element 28 to a frequency interval or bandwidth illustrated as curve 35 in FIG. 4c and corresponding to a preselected quasi-linear interval of the bandwidth of delay line 28, which quasi-linear interval is illustrated as a portion of response curve 36 in FIG. 5. Hence, the response of delay element 28 will be a linear time progression of discrete frequencies, corresponding to a linearly frequency-modulated wave form similar to curve 21 of FIG. 2a. The intermediate-frequency, frequency-modulated waveform output of delay line 28 may then be multiplied up (or down) to a desired carrier frequency region by a frequency multiplier 32 or like means known in the art. Such multiplied frequency may then be applied to modulator 14 as a carrier-to-be-amplitude modulated, in lieu of the input from BWO 15.

In the design of a device contructed and arranged in accordance with the embodiment of FIG. 1 and successfully operated, the following combinations of quantitative design parameters were employed:

| | |
|---|---|
| System PRF | As high as 2 kilocycles per second |
| System pulsewidth | 0, 5, 2 and 5 microseconds |
| Carrier frequency (nominal) | 9 kilomegacycles per second |
| Carrier swept frequency range | 300 megacycles per second |
| Amplitude modulation frequency | 60 megacycles |
| Percent amplitude modulation | 100% |

Although the concept of the invention has been described as a pulsed energy system employing a linearly frequency-modulated carrier which is frequency-coded by means of an amplitude modulation at a fixed intermediate frequency, the concept of the invention is not so limited. If desired the frequency-coding may include amplitude modulation at a chirped IF frequency, in lieu of a fixed IF frequency, as shown in FIG. 6.

Figure 6:
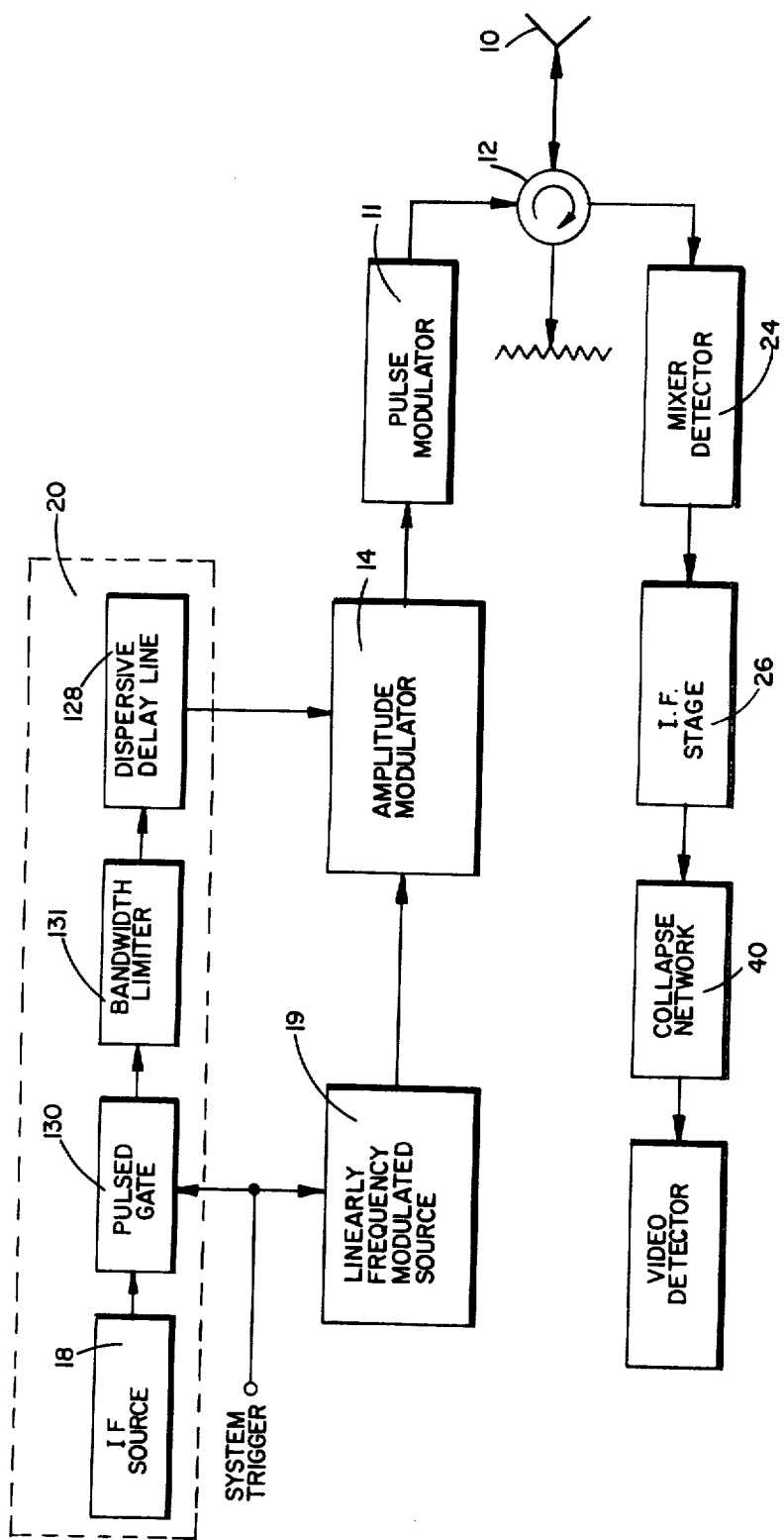

Referring to FIG. 6, there is illustrated an alternate embodiment of the inventive concept and utilizing a chirped IF amplitude modulation. There is provided a source 19 of a linearly frequency modulated carrier, corresponding to the function provided by the arrangement of FIG. 3 or the cooperation of elements 15 and 16 of FIG. 1. There is also provided elements 10, 11, 12, 14, 18, 24 and 26, all constructed and arranged to cooperate substantially the same as the like-referenced elements of FIG. 1. There is further provided a source 20 of a linearly frequency-modulated intermediate frequency coding signal, operatively coupled as a modulating input to amplitude modulator 14. Source 20 may be comprised of a fixed-frequency IF source 18 coupled to modulator 14 by means of a pulsed gate 130, bandpass filter 131 and dispersive delay line 128, which latter elements are arranged to cooperate substantially in the manner of the linearly frequency-modulating combination of FIG. 3. A corresponding collapse network 40 is employed at the output of receiver IF stage 26 and having a phase-versus-frequency dispersion characteristic complementary to that associated with the utilized quasi-linear region of dispersive delay element 128. The utilization of such devices in conventional chirp-type pulse-compression systems (to achieve improved range resolution) is well understood in the art (as indicated, for example, at pages 493–497 of "Introduction to Radar Systems" by Skolnik, published by McGraw-Hill (1962)), and therefore element 40 is illustrated in block form only.

Because the collapse network need be matched only to the FM-IF modulation of the transmitted carrier and not to the FM carrier itself, problems of stability in maintaining a match in the arrangement of FIG. 6 are thought to be less stringent than in the case of conventional chirp type pulse compression systems. It is understood that the bandpass of IF receiver stage 26 in FIG. 6 is selected to accomodate the bandwidth of the IF modulation envelope. Such bandwidth requirement, as well as the IF bandwidth requirement of the arrangement of FIG. 1, imposes no unusual additional wide band requirements upon the RF, or microwave, receiver stages.

As noted above, the disclosed FM-AM pulsed energy system, relative to the simultaneous multiple frequency system of copending application Ser. No. 476,630, utilizes a smaller bandwidth to achieve the same discrete target-versus-clutter enhancement while suffering less noise-to-signal ratio. Such smaller bandwidth also serves to reduce mutual interference among a number of systems operating in consort. Interference effects can be further reduced by the use of different IF amplitude coding frequencies. Also, the mechanization of the subject device is simpler, the complex closed-loop arrangement of single side band modulators being avoided. Further, because co-phasal simultaneous multiple frequency transmission is not employed, high peak-to-average power ratios and transmitter saturation problems are avoided.

In addition to the above-described advantages, the subject invention lends itself to efficient integration with other equipment in a multi-mode system, in that the frequency coding equipment thereof may also be employed in an associated C-W doppler mode equipment.

Accordingly, it is to be appreciated that an improved wide-band pulsed energy system has been described.

Although the system has been described in terms of a pulse-type radar system, the concept of the invention is not so limited and comprehends application and utilization in other types of pulsed energy systems such as, for example, sonar systems and pulsed laser systems.

Although the invention has been illustrated and described in detail, it is to be clearly understood that the same is by way of illustration and example only and is not to be taken by way of limitation, the spirit and scope of this invention being limited only by the terms of the appended claims.

I claim:

1. In a pulse-type energy system,
   Means for transmitting a linearly frequency-modulated carrier wave pulse having a preselected one of a fixed frequency and chirped amplitude modulation envelope; and
   Receiving means responsive to received echoes of said transmitted pulse for providing an output corresponding to said modulation envelope.

2. The device of claim 1 in which said means for transmitting comprises means for generating a linearly frequency modulated carrier having a fixed frequency amplitude modulation.

3. The device of claim 2 in which said receiving means comprises
   A non-linear receiver mixer-detector stage; and
   An intermediate frequency, narrow-bandpass receiver stage responsively coupled to an output of said mixer-detector stage, a bandpass center frequency of said intermediate frequency stage corresponding to the fixed frequency of said amplitude modulation.

4. The device of claim 1 in which said means for transmitting comprises
   Means for generating a linearly frequency-modulated carrier wave;
   A fixed frequency intermediate-frequency source; and
   An amplitude modulator having a first input responsively coupled to said generating means and further having a modulating input responsively coupled to said intermediate frequency source for providing a modulated output.

5. The device of claim 4 in which there is further provided a pulse-modulator responsive to said modulated output for pulse-modulation thereof, said pulse modulator and said generating means being coupled to operate synchronously.

6. The device of claim 4 in which said means for generating a linearly frequency modulated carrier wave comprises A phase-dispersive delay line element having an associated bandwidth;

A source of a continuous wave having a stable intermediate frequency lying within the bandwidth of said delay line element;

Pulse modulation means for pulsewidth modulating said CW source, the pulsewidth of said modulation means being substantially less then the pulsewidth of said pulsed system and preselected to produce sideband frequencies outside a preselected bandwidth;

Bandwidth-limiting means coupled to the output of said modulator for bandwidth-limiting the same to an interval corresponding to a quasi-linear phase dispersive interval of the bandwidth of said delay line, the input of said phase dispersive delay line being coupled to the output of said bandwidth limiting means to impose a linear frequency-modulation envelope upon said bandwidth-limited output; and Frequency multiplier means for multiplying said frequency-modulated output up to a desired transmitting frequency range.

7. The device of claim 1 in which transmitter comprises means for generating a linearly frequency-modulated carrier having a chirped intermediate frequency amplitude modulation.

8. The device of claim 7 in which said receiving means comprises

A non-linear receiver mixer-detector stage;

An intermediate frequency receiver stage having a bandpass corresponding to the bandwidth of said chirped intermediate frequency modulation; and A pulse compression network having a phase versus frequency dispersive property complimentary to the chirped property of said modulation envelope.

* * * * *